(No Model.)

S. STEINBERGER.
VALVE.

No. 309,991. Patented Dec. 30, 1884.

WITNESSES:
Chas. Maas.
J. Henry Ballmann.

INVENTOR:
Samuel Steinberger.
Per James B. Lizius & Co.
Attorneys.

of valve C, right under the
UNITED STATES PATENT OFFICE.

SAMUEL STEINBERGER, OF NORTH MADISON, INDIANA.

VALVE.

SPECIFICATION forming part of Letters Patent No. 309,991, dated December 30, 1884.

Application filed May 3, 1884. (No model.)

*To all whom it may concern:*

Be it known that I, SAMUEL STEINBERGER, a citizen of the United States, residing at North Madison, in the county of Jefferson and State of Indiana, have invented certain new and useful Improvements in Valves, of which the following is a specification.

My invention relates to improvements in cup-valves, such as are used in steam, hydraulic, and air-compressing machines.

The objects of my invention are to provide a strong substantial valve which will work more smoothly, and which can be made at a smaller expense, than the valves now in use.

Figure 1:
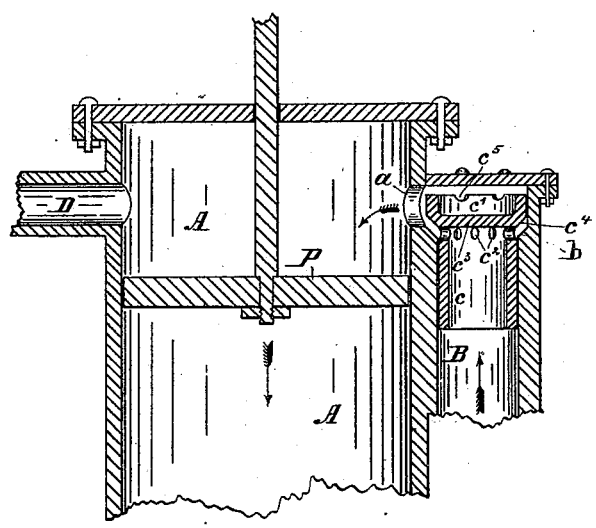
Figure 2:
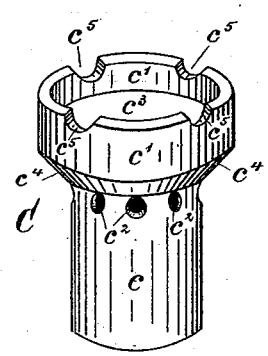

In the accompanying drawings, Figure 1 is a vertical section through the valve and its adjoining parts, and Fig. 2 a perspective view of the valve proper.

Similar letters refer to similar parts throughout the several views.

A is the condensing-cylinder in which the piston P operates. B is the inlet or supply pipe through which the air is introduced through the valve C into the condensing-cylinder A. The vacuum created by the downward stroke of the piston P in the cylinder A, above the piston P, raises the valve C in the supply-pipe B. Said valve C is constructed as follows: The lower part or the stem of the valve forms a cylinder, $c$, open at the bottom, the outer diameter of said cylinder $c$ being as near the size of the inner diameter of the inlet-pipe B as will allow the cylinder $c$ to operate freely up and down in said inlet-pipe B. The upper part of the valve C forms a cylindrical flange, $c'$, of a larger outer diameter than the one of the cylindrical stem $c$. Between the upper and lower parts, $c$ and $c'$, is a solid partition, $c^3$. Where the cylinder $c$ and the flange $c'$ connect the outside $c^4$ is turned true, and bevel-shaped, corresponding to the bevel-shaped recess $b$ in the tube B, which forms the valve-seat for the valve C. Under the beveled rest $c^4$ of the valve C, right under the partition $c^3$, are a number of openings, $c^2 c^2 c^2$, cut through the cylinder $c$, to allow the air, when the valve C is raised above its seat $b$, to pass out from the cylinder $c$, up and through the opening $a$, into the condensing-cylinder A. Notches $c^5 c^5$ are cut out of the rim of the flange $c'$ in several places to allow air to pass inside of the flange $c'$ and prevent the valve C being sucked and stuck onto the cap of the supply-pipe B. The upward stroke of the piston P forces the air that by the downward stroke is sucked into the condensing-cylinder A out through a valveway, D, into an air-reservoir, while the valve C, by its own weight and the pressure of the condensed air, drops into its seat $b$ and prevents the escape of the air through the supply-pipe B. In my valve the cylindrical stem $c$ acts as a guide and prevents any rattling, breaking, or twisting of the valve.

What I claim, and desire to secure by Letters Patent, is—

A valve having a cylindrical stem and guide, $c$, a cylindrical top flange, $c'$, provided with notches $c^5 c^5 c^5$, a solid partition, $c^3$, between the stem $c$ and the flange $c'$, the openings $c^2 c^2$ in the cylindrical stem $c$, and the bevel-shaped valve-rest $c^4$, in combination with the bevel-shaped valve-rest $b$, the inlet-pipe B, constructed as described, the cylinder A, and the opening $a$, all substantially arranged as described, and for the purpose specified.

In testimony whereof I have signed my name to this specification in the presence of two subscribing witnesses.

SAML. STEINBERGER.

Witnesses:
CHARLES MAAS,
J. HENRY BALLMANN.